(12) United States Patent
Nakanishi

(10) Patent No.: US 8,632,010 B2
(45) Date of Patent: Jan. 21, 2014

(54) PHOTOELECTRIC CONVERSION APPARATUS AND DRIVING METHOD THEREOF

(75) Inventor: Manabu Nakanishi, Ebina (JP)

(73) Assignee: Canon Kabushiki Kaisha, Tokyo (JP)

( * ) Notice: Subject to any disclaimer, the term of this patent is extended or adjusted under 35 U.S.C. 154(b) by 1039 days.

(21) Appl. No.: 12/188,815

(22) Filed: Aug. 8, 2008

(65) Prior Publication Data

US 2009/0057407 A1    Mar. 5, 2009

(30) Foreign Application Priority Data

Aug. 31, 2007  (JP) .................................. 2007-226527

(51) Int. Cl.
    *G06K 7/10* (2006.01)
(52) U.S. Cl.
    USPC ........................................................ 235/454
(58) Field of Classification Search
    USPC ........................................................ 235/454
    See application file for complete search history.

(56) References Cited

U.S. PATENT DOCUMENTS

| | | | | |
|---|---|---|---|---|
| 4,661,860 A | * | 4/1987 | Miyazawa | ..................... 358/494 |
| 5,335,094 A | * | 8/1994 | Kaifu et al. | ..................... 358/494 |
| 5,348,892 A | * | 9/1994 | Miyake et al. | ................... 438/59 |
| 2007/0057190 A1 | * | 3/2007 | Hatanaka et al. | ........ 250/370.09 |

FOREIGN PATENT DOCUMENTS

| | | |
|---|---|---|
| JP | 61-120570 | 6/1986 |
| JP | 61-214657 | 9/1986 |
| JP | 2-210950 | 8/1990 |

OTHER PUBLICATIONS

Taiwanese Office Action dated Nov. 30, 2011 in counterpart Taiwanese Application No. 097131276, and English translation thereof.
Chinese Notification of the Fourth Office Action dated Mar. 5, 2013, in counterpart Chinese Patent Application No. 200810212472.8, and English language translation thereof.

* cited by examiner

*Primary Examiner* — Daniel Hess
*Assistant Examiner* — David Tardif
(74) *Attorney, Agent, or Firm* — Fitzpatrick, Cella, Harper & Scinto

(57) ABSTRACT

A photoelectric conversion apparatus which includes a plurality of sensor chips wherein each sensor chip is arranged into a plurality of unit blocks each having plural photoreceiving elements. A common signal reading line is provided, through which signals are read out from the plurality of photoreceiving elements of the plurality of sensor chips. After sequentially reading out signals from first photoreceiving elements included in each of the plurality of unit blocks in a first sensor chip, and before sequentially reading out signals from photoreceiving elements other than the first photoreceiving elements included in unit blocks of the first sensor chip, signals are read out to the common signal reading line from the photoreceiving elements included in the unit blocks in sensor chips other than the first sensor chip. Thus, a multi-chip type image sensor having a smaller chip size with desired performance is provided.

7 Claims, 6 Drawing Sheets

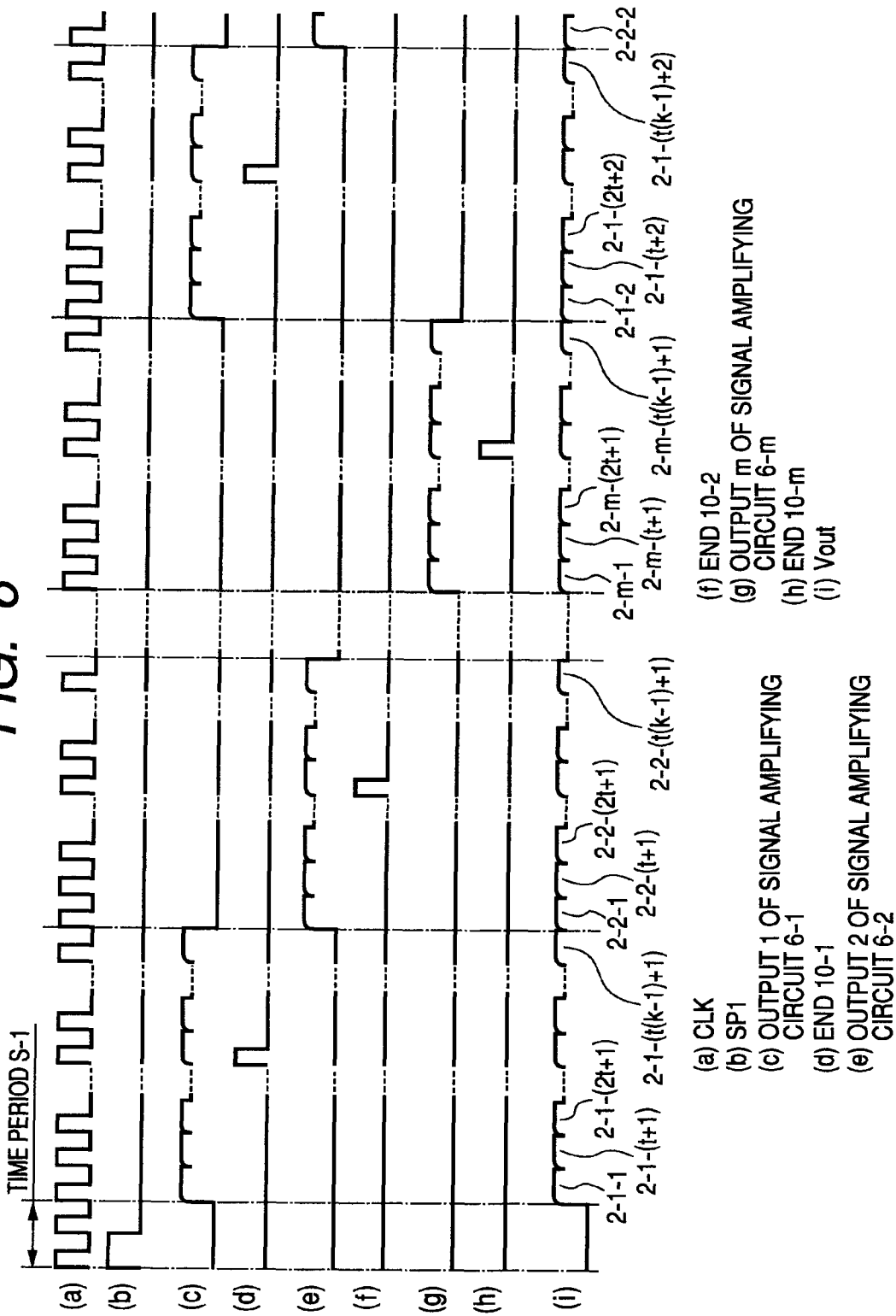

PHOTOELECTRIC CONVERSION APPARATUS AND DRIVING METHOD THEREOF

BACKGROUND OF THE INVENTION

1. Field of the Invention

The present invention relates to a photoelectric conversion apparatus and a driving method thereof, and more particularly to a photoelectric conversion apparatus in which sensor chips each including a plurality of photoreceiving elements are arranged and a driving method thereof.

2. Description of the Related Art

Conventionally, linear image sensors using photoelectric conversion apparatus are frequently used as reading apparatus of facsimile machines, scanners, and the like.

Since these linear image sensors are produced on silicon wafers, their sensor lengths are limited by their wafer sizes. Consequently, it is difficult to produce linear image sensor chips having the same lengths as those of originals, and only linear image sensor chips having shorter sensor lengths could be often obtained.

Accordingly, the reading apparatus have de-magnified the reflected lights from the originals with optical systems and conducts the de-magnified projection of the reflected lights onto the linear image sensors to read images.

However, the reading apparatus using such de-magnification optical systems have to take large spaces for the optical systems and cannot obtain sufficient resolution.

Accordingly, in order to resolve the problem, a multi-chip type image sensor including a plurality of linear image sensors arranged on a straight line has been used.

A configuration disclosed in Japanese Patent No. 2823578 has conventionally been known as a configuration of the multi-chip type image sensors.

In order to reduce manufacturing costs by increasing the number of chips produced from one silicon wafer as much as possible, efforts of reducing (hereinafter also expressed as shrinking) chip sizes have conventionally been performed.

As a method of shrinking chip sizes, the method in which of a plurality of photoreceiving elements share a scanning shift register, a capacitor element for temporarily storing electric signals generated in the photoreceiving elements, and the like, is generally known.

Because the method enables the reduction of the numbers of the elements and components, such as the shift registers and the capacitor elements, which have relatively larger occupation areas, the method enables the reduction of a chip size.

In case of an image sensor chip realized by the method, a plurality of photoreceiving elements shares a shift register and a capacitor element. Consequently, it is impossible to read out the electric signals generated in all of the photoreceiving elements by a single readout scanning.

In order to conduct the readout operations of all the photoreceiving elements, the readout operations of the electric signals generated in a part of the photoreceiving elements are first conducted in order by scanning a shift register.

Next, the readout operations of the electric signals generated by the photoreceiving elements the readout operations of which have not been performed in the preceding scanning are performed by scanning the shift register again.

By repeating the readout scanning mentioned above the times of the number of photoreceiving elements sharing the shift register and the capacitor element, the readout operations of all of the photoreceiving elements are completed.

However, in case of the readout method mentioned above, a time period for conducting the switching to other photoreceiving elements for the next readout scanning becomes a blanking time period during which no optical signals can be output. Consequently, the blanking time periods in an optical signal outputting period increase in proportion to the number of repetitions of the scanning.

In particular, in case of a multi-chip type image sensor, the repetition scanning is necessary for each image sensor chip. Consequently, the blanking time period increases in proportion to the number of the connected image sensor chips and the repetition times of the scanning. As a result, high speed readout of optical signal outputs could not performed sometimes.

Accordingly, the present invention aims to provide a multi-chip type image sensor having a shrunk chip size with desired performance secured.

SUMMARY OF THE INVENTION

One aspect of the present invention is a driving method of a photoelectric conversion apparatus comprising a plurality of sensor chips each comprising a plurality of unit blocks each comprising: a plurality of photoreceiving elements, a plurality of first switches each arranged correspondingly to each one of the plurality of photoreceiving elements for reading a signal from each of the photoreceiving elements, and a plurality of second switches each one arranged correspondingly to plural ones of the plurality of first switches for reading a signal from the first switches, wherein the photoelectric conversion apparatus further comprises a common signal reading line through which signals are read out from the plurality of photoreceiving elements of the plurality of sensor chips, and wherein, after sequentially reading out signals from a first photoreceiving elements included in the plurality of unit blocks to the common signal reading line, and before sequentially reading out signals from the photoreceiving elements other than the first photoreceiving elements included in the same sensor chip to the common signal reading line, signals are readout to the common signal reading line from the photoreceiving elements included in the unit blocks in the other sensor chips, as a unit for solving the problem mentioned above.

Moreover, another aspect of the present invention is a photoelectric conversion apparatus comprising a plurality of sensor chips each comprising a plurality of unit blocks each comprising: a plurality of photoreceiving elements, a plurality of first switches each arranged correspondingly to each of the plurality of photoreceiving elements for reading a signal from each of the photoreceiving elements, and a plurality of second switches each one arranged correspondingly to plural ones of the plurality of first switches for reading a signal from the first switches, wherein the photoelectric conversion apparatus further comprises a common signal reading line through which signals are read out from the plurality of photoreceiving elements of the plurality of sensor chips, and wherein each of the plurality of sensor chips has an input portion for inputting a signal for starting reading of signals from the photoreceiving elements, and a sensor chip of a first stage receives from its input portion a signal outputted from a sensor chip of the final stage.

According to the present invention, for example, the shrink of a chip size and speeding up can be simultaneously realized.

Further features of the present invention will become apparent from the following description of exemplary embodiments with reference to the attached drawings.

BRIEF DESCRIPTION OF THE DRAWINGS

FIG. 6 is a timing chart for describing the operation of the photoelectric conversion apparatus as the third embodiment of the present invention.

DESCRIPTION OF THE EMBODIMENTS

First Embodiment

Figure 1:
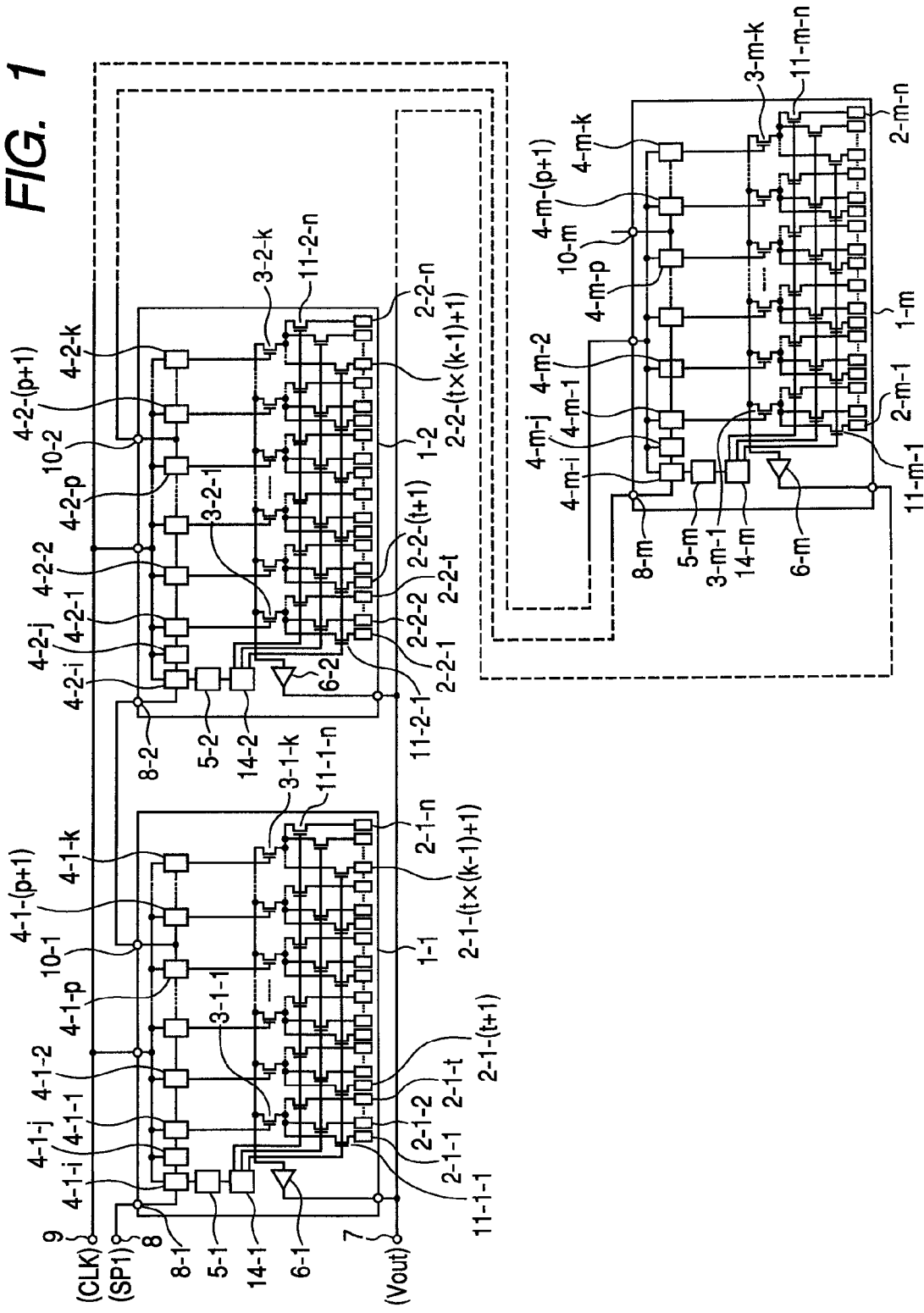
FIG. 1 is a diagram illustrating the configuration of a multi-chip type image sensor a plurality of arranged image sensor chips constituting a photoelectric conversion apparatus as a first embodiment of the present invention.
Figure 2:
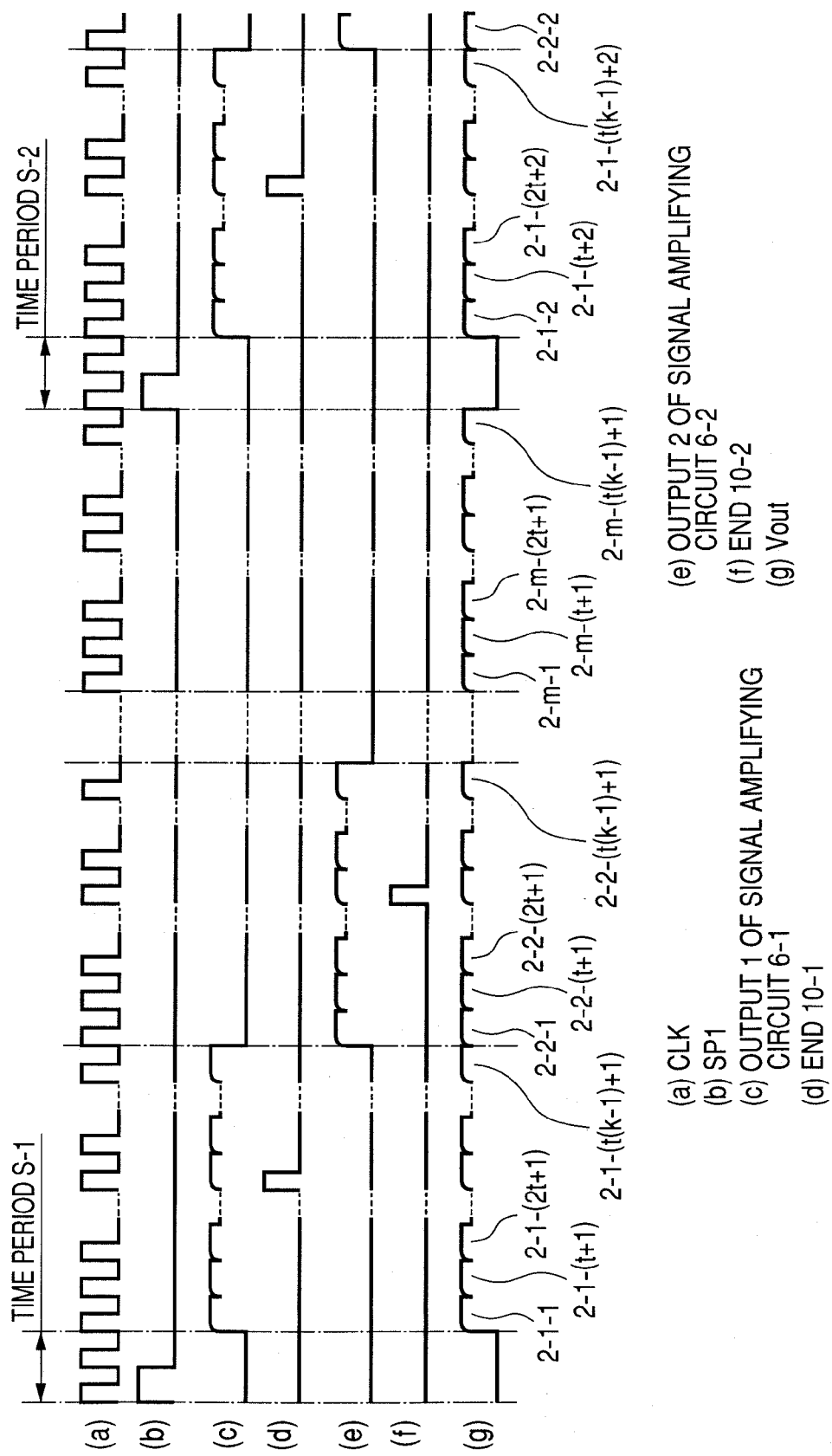
FIG. 2 is a timing chart for describing the operation of the photoelectric conversion apparatus as the first embodiment of the present invention.

FIG. 1 illustrates the configuration of a multi-chip type image sensor including a plurality of arranged image sensor chips constituting a photoelectric conversion apparatus as a first embodiment of the present invention, and FIG. 2 illustrates a timing chart.

In FIG. 1, a multi-chip type image sensor includes image sensor chips (hereinafter referred to as sensor chips) 1-1, 1-2, ..., 1-$m$, which are connected to one another.

The sensor chips 1-1, 1-2, ..., 1-$m$ include photoreceiving elements 2-1-1 to 2-1-$n$, 2-2-1 to 2-2-$n$, and 2-$m$-1 to 2-$m$-$n$, respectively. Each of the photoreceiving elements 2 converts an input optical signal into an electric signal.

The sensor chips 1-1, 1-2, ..., 1-$m$ further include first MOS switches 11-1-1 to 11-$m$-$n$, respectively, as first switches, and second MOS switches 3-1-1 to 3-$m$-$k$, respectively.

Each of the second MOS switches 3 as a second switch is arranged to t first MOS switches 11 to be connected to each other.

The sensor chips 1-1, 1-2, ..., 1-$m$ further include selecting circuits 14-1 to 14-$m$, respectively. The selecting circuits 14-1 to 14-$m$ controls the turning-on and turning-off of the first MOS switches 11-1-1 to 11-$m$-$n$, respectively.

The sensor chips 1-1, 1-2, ..., 1-$m$ further include shift registers 4-1-1 to 4-1-$k$, respectively, for conducting signal reading. The shift registers 4-1-1 to 4-1-$k$ control turning-on and turning-off of the second MOS switches 3-1-1 to 3-$m$-$k$, respectively.

The sensor chips 1-1, 1-2, ..., 1-$m$ further include pre-shift registers 4-1-$i$ and 4-1-$j$ to 4-$m$-$i$ and 4-$m$-$j$, respectively, for delaying start signals to reading shift registers 4-1-1 to 4-1-$k$, respectively.

The sensor chips 1-1, 1-2, ..., 1-$m$ further include control circuits 5-1 to 5-$m$, respectively. The operations of the control circuits 5 are controlled by the signals from the pre-shift registers 4.

The sensor chips 1-1, 1-2, ..., 1-$m$ further include signal amplifying circuits 6-1 to 6-$m$, respectively, for amplifying electric signals generated by the photoreceiving element 2-1-1 to 20-$m$-$n$, respectively. The signal amplifying circuits 6-1 to 6-$m$ includes constant current circuits (not illustrated), the operation states and waiting states of which are switched by the control circuits 5-1 to 5-$m$, respectively.

Signals photoelectrically converted by the photoreceiving elements 2 are output to the signal amplifying circuits 6 through the first MOS switches 11 and the second MOS switches 3.

The photoelectric conversion apparatus includes a signal output terminal 7 connected to the signal amplifying circuit 6 of each of the sensor chips 1 and a start signal input terminal 8 as an input portion. The photoelectric conversion apparatus further includes a clock signal input terminal 9 through which a clock signal CLK is input from the outside of the multi-chip type image sensor.

The sensor chips 1-1, 1-2, ..., 1-$m$ further include END signal output terminal 10-1 to 10-$m$, respectively, for outputting signals output from the respective p$^{th}$ steps 4-1-$p$, 4-2-$p$, to 4-$m$-$p$ of the shift registers 4 to the outside of the sensor chips 1.

A start signal SP1 is input to a start signal input terminal 8-1 of the sensor chip 1-1 as the first sensor chip situated at a first stage from the outside of the multi-chip type image sensor.

END signals output from the sensor chips 1 at the respective preceding stages are input to the respective start signal input terminals 8-2 to 8-$m$ of the sensor chips 1-2 to 1-$m$ arranged at second stage (as a second sensor chip) and after.

For example, an END signal is input from the END signal output terminal 10-1 of the first sensor chip 1-1 into the start signal input terminal 8-2 of the second sensor chip 1-2.

The aforesaid letter k indicates the number of steps of the sift registers 4 and the number of the second MOS switches 3 that are arranged in each of the sensor chips 1, and the letter n indicates the numbers of the photoreceiving elements 2 and the first MOS switches 11 that are arranged in each of the sensor chips 1.

The letter m indicates the number of the sensor chips 1 constituting the multi-chip type image sensor.

Moreover, each of the sensor chips 1 includes k unit blocks each including t photoreceiving elements 2, the same number of first MOS switches 11 as the number of the photoreceiving elements 2, and one second MOS switch 3 to which the first MOS switches 11 are commonly connected.

Each of the selecting circuits 14 selects one of the t first MOS switches 11 in each of the unit blocks to control the selected first MOS switch 11 to be turned on, and thereby selects one of the photoreceiving elements 2 in the unit block to change the selected photoreceiving element 2 to be in the state of receiving a readout operation.

By putting the above-mentioned relations in order using the variables k, n, m, and t, the number n of the photoreceiving elements 2 formed in one of the sensor chips 1 is expressed by the relation n=k×t.

Moreover, the number of all of the photoreceiving elements 2 in the multi-chip type image sensor is m×n.

Next, a readout operation of the multi-chip type image sensor of the first embodiment of the present invention is described in the order of events with reference to FIGS. 1 and 2.

After conducting light accumulation, a readout operation is started by inputting a start signal SP1 from the start signal input terminal 8 to the first sensor chip 1-1 in synchronization with the clock signal CLK input to the clock signal input terminal 9.

The start signal SP1 is transferred to the shift register 4-1-$j$ at the next step through the shift register 4-1-I for delaying the start signal SP1 for a certain time period, and is output to the control circuit 5-1.

When the control circuit 5-1 receives the start signal SP1, which has been delayed for the certain time period by passing through the pre-shift register 4-1-*i* for delaying, the control circuit 5-1 outputs a control signal for changing the constant current circuit in the signal amplifying circuit 6-1 to be in the operating state thereof, and changes the signal amplifying circuit 6-1 to the state capable of conducting an amplifying operation.

The start signal SP1 further passes through the pre-shift register 4-1-*j* for delaying to be input to the shift register 4-1-1.

When the shift register 4-1-1 receives the signal SP1 from the shift register 4-1-*j*, the shift register 4-1-1 makes the second MOS switches 3-1-1 to 3-1-*k* be in a conduction state sequentially in synchronization with the clock signal CLK.

At this time, during a time period S-1, the selecting circuit 14-1 controls the first MOS switches to 11-1-*n* to make k of them be in conduction states so as to enable one of the photoreceiving elements 2 from each unit block and a total of k photoreceiving elements 2 in total to be read.

In the present embodiment, for example, it is supposed that the MOS switches of the first MOS switches 11-1-1, 11-1-(t+1), . . . , 11-1-(t×(x−1)+1) are selected. The letter x denotes an integer within a range from 1 to k, both inclusive.

Thereby, the signals from the photoreceiving elements 2 connected to the signal amplifying circuit 6-1 through the first MOS switches 11-1-1, . . . , 11-1-(t×(k−1)+1) and each of the second MOS switches 3-1-1 to 3-1-*k* are amplified by the signal amplifying circuit 6-1. Then, the amplified signals are output to the signal output terminal 7 as signal outputs Vout.

As illustrated in the timing chart of FIG. 2, the multi-chip type image sensor mentioned above outputs k×m signals corresponding to each of the photoreceiving elements 2-1-1, 2-1-(t+1), . . . , 2-*m*-(t×(k−1)+1) in order as the signal outputs Vout.

As described above, the multi-chip type image sensor of the present embodiment conducts readout operations of the photoreceiving elements 2 selected by the selecting circuit 14-1 in an order not in the order of the arrangement of the photoreceiving elements 2.

Moreover, an END signal is output from the END signal output terminal 10-1 to the outside simultaneously with the turning-on of the second MOS switch 3-1-*p* by an output signal of the shift register 4-1-*p* in a series of readout operations of the sensor chip 1-1.

Then, the output END signal is input to the start signal input terminal 8-2*a* of the next stage sensor chip 1-2 as a start signal.

Also in the next stage sensor chip 1-2, the readout operations of signals and the output of the END signal are performed similarly in the sensor chip 1-1.

The readout operations of signals are continuously executed by inputting the END signals of the preceding stages into the start signal input terminals 8 in the next stage sensor chips 1 sequentially at the predetermined timing while conducting the readout operations of the preceding stage sensor chips 1 in this manner.

When the readout operations of signals have been executed to the sensor chip 1-*m* of the final stage, the selecting circuits 14-1 to 14-*m* switch the states of the first MOS switches 11 in a time period S-2.

Then, the readout operations of the signals corresponding to the photoreceiving elements 2 different from the photoreceiving elements 2 that have been read previously from the sensor chip 1-1 of the first stage is started.

The switching control of the first MOS switches 11 in the selecting circuits 14 can be realized by the methods described below.

One method is that the selecting circuits 14 receive trigger signals from the outside of the sensor chips 1 to conduct the switching control. Another one is that the reading time periods of the multi-chip type image sensor are previously stored in a built-in counter, and the switching control of the selecting circuits 14 is conducted at predetermined timing from the built-in counter.

In the present embodiment, for example, it is supposed that every t first MOS switch 11 of the first MOS switches 11-1-2, 11-1-(t+2), . . . , 11-1-(t×(x−1)+2) is next selected. The letter x is an integer within a range from 1 to k, both inclusive.

Similarly to the preceding readout operations, the operations are started by inputting the start signal SP1 into the first sensor chip 1-1 through the start signal input terminal 8.

By receiving the start signal SP1, the shift registers 4-1-1 to 4-1-*k* turn the MOS switches 3-1-1 to 3-1-*k* into conduction states in order, respectively, in synchronization with the clock signal CLK.

At this time, the first MOS switches 11-1-2, 11-1-(t+2), . . . , 11-1-(t×(k−1)+2) among the first MOS switches 11 are previously set to conduction states by the selecting circuit 14-1.

Consequently, the signals generated by the photoreceiving elements 2 connected to the selected first MOS switches 11 by photoelectric conversion pass through the first MOS switches 11 and the second MOS switches 3 to be amplified by the signal amplifying circuit 6-1. Then, the amplified signals are output to the signal output terminal 7 as the signal outputs Vout.

As described above, the readout operation is executed to all of the photoreceiving elements 2 by repeating the switching control of the photoreceiving elements 2 by the selecting circuits 14 and a series of readout operations t times.

The aforesaid operation description of the present embodiment has been given to the operation in the case of inputting the start signal SP1 from the start signal input terminal 8 of the sensor chip 1-1 of the first stage as an example.

However, the present invention can be also applied to the generally frequently implemented configuration of inputting a start signal into the control circuit 5-1 and the shift register 4-1-1 through an internal logic circuit in the sensor chip 1-1.

As described above, the present embodiment can shorten the time periods for selecting the photoreceiving elements 2 to t times, while the conventional configuration required t×m times because readout scanning has been repeated to all of the respective m sensor chips constituting the multi-chip type image sensor t times by the conventional configuration. Consequently, the high-speed readout of optical signal outputs can be conducted. Moreover, both of the high-speed readout and the reduction (shrink) of a chip size can be achieved.

Second Embodiment

Figure 3:
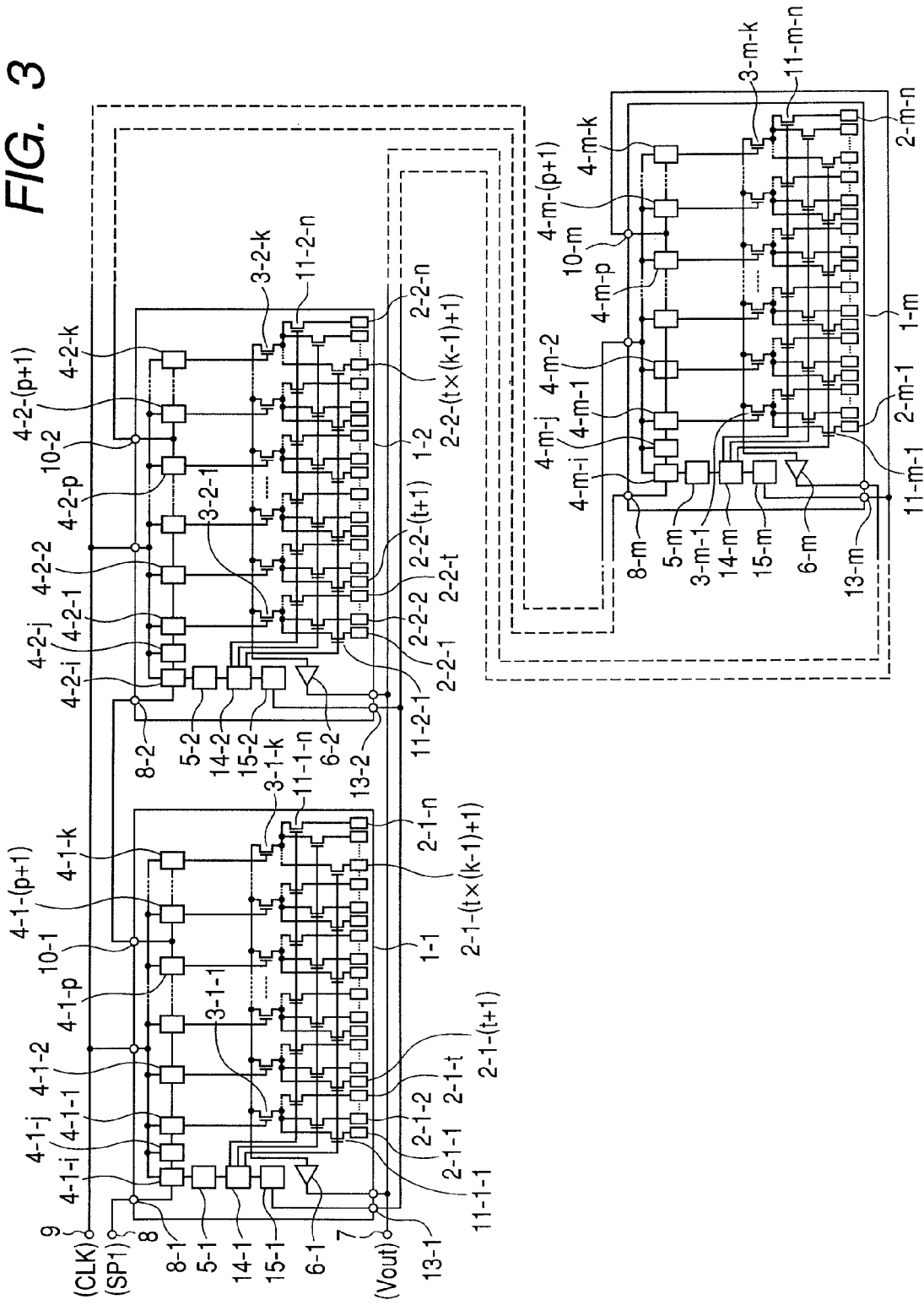
FIG. 3 is a diagram illustrating the configuration of a multi-chip type image sensor including a plurality of arranged image sensor chips constituting a photoelectric conversion apparatus as a second embodiment of the present invention.
Figure 4:
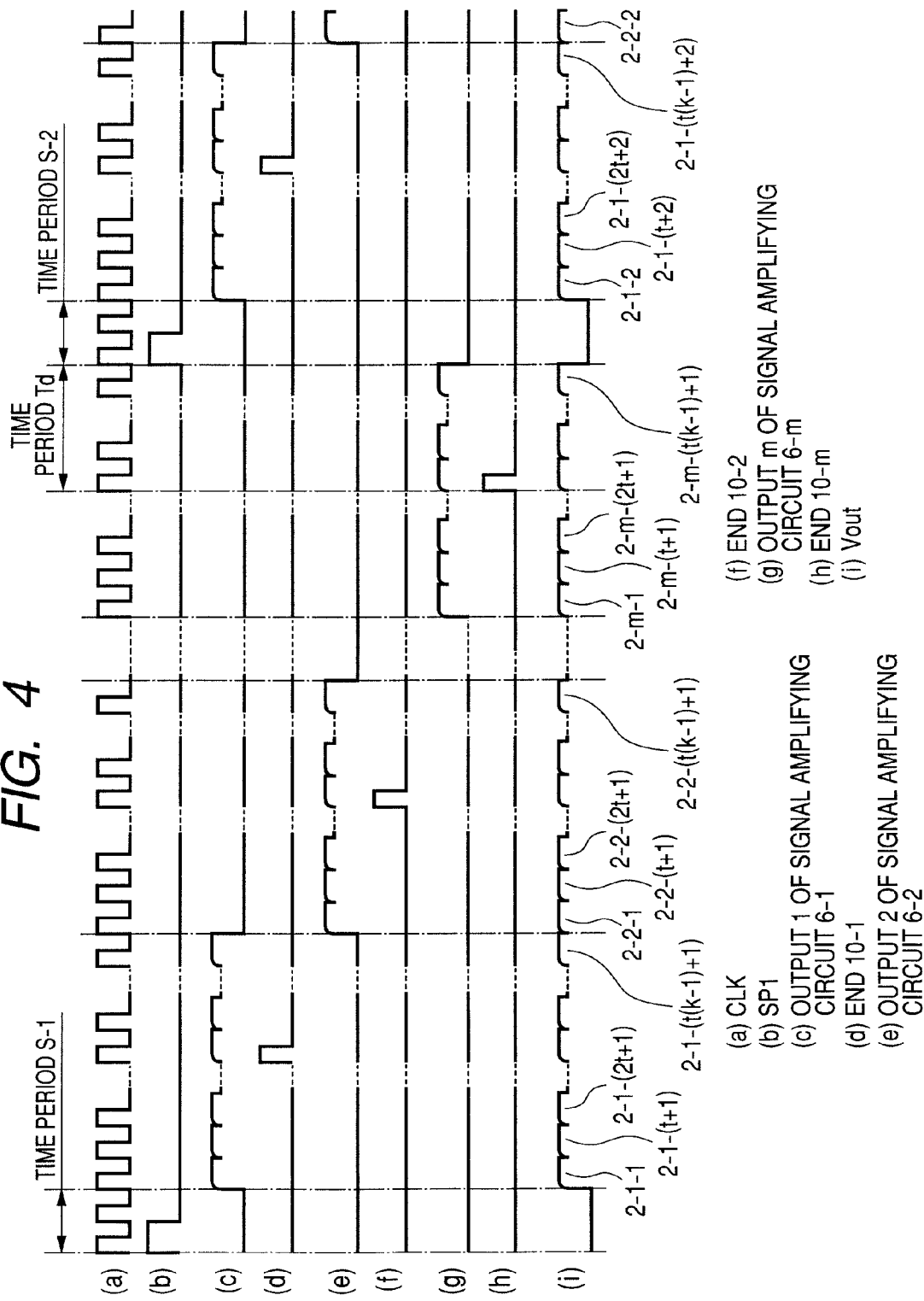
FIG. 4 is a timing chart for describing the operation of the photoelectric conversion apparatus as the second embodiment of the present invention.

FIG. 3 illustrates the configuration of a multi-chip type image sensor including arranged image sensor chips constituting photoelectric conversion apparatus according to a second embodiment of the present invention, and FIG. 4 is a diagram illustrating a timing chart.

The components common to both of FIGS. 1 and 2 are denoted by the same reference numerals, and their descriptions are omitted.

The multi-chip type image sensor includes switching signal input terminals 13-1 to 13-*m*, to which the END signal of the sensor chip 1-*m* of the final stage is input, as shown in FIG. 3. The multi-chip type image sensor further includes switching signal delay circuits 15-1 to 15-*m*, which are the circuits for delaying the signals input to the switching signal input terminals 13-1 to 13-*m* for a certain constant time period and then outputting the delayed signals to the selecting circuits 14-1 to 14-*m*.

Moreover, in the present embodiment, the END signal of the sensor chip 1-*m* of the final state is output from the END signal output terminal 10-*m* thereof at the timing END 10-*m* illustrated in FIG. 4.

In the following, the operation of the multi-chip type image sensor according to the second embodiment of the present invention will be described.

In the present embodiment, after light accumulation, the operation of the embodiment is started by the input of the start signal SP1 from the start signal input terminal 8 into the first sensor chip 1-1 in synchronization with the clock signal CLK from the clock signal input terminal 9.

When the start signal SP1 is input, the signal readout operations of the sensor chips 1 are conducted sequentially similarly to the first embodiment.

As illustrated in the timing chart of FIG. 4, the k×m signals corresponding to the respective photoreceiving elements 2-1-1, 2-1-(t+1), . . . , 2-*m*-(t×(k−1)+1) are amplified by the signal amplifying circuits 6, respectively, to be sequentially output as the signal outputs Vout.

Moreover, the outputting of the END signal is conducted from the END signal output terminal 10-*m* during the readout operation of the sensor chip 1-*m* of the final stage.

The END signal from the END signal output terminal 10-*m* is illustrated as END 10-*m* in FIG. 4, and are input to the switching signal input terminals 13-1 to 13-*m* of all of the sensor chips 1-1 to 1-*m* as the switching signal of the photoreceiving elements 2.

The END signal 10-*m* input to the switching signal input terminals 13-1 to 13-*m* is delayed for the elapse of the time period Td from the timing at which the END signal 10-*m* is output to the end of the optical signal output of the sensor chip 1-*m*. The delay is performed by the switching signal delay circuits 15-1 to 15-*m* in the respective sensor chips 1-1 to 1-*m*. After that, the delayed END signal 10-*m* is input to the selecting circuits 14-1 to 14-*m* in the sensor chips 1-1 to 1-*m*.

Thereby, the switching to the photoreceiving element 2 other than the photoreceiving element 2 that has been subjected to the previous readout at the timing of the completion of the signal outputting time period of the sensor chip 1-*m* is conducted.

The same operations as those in the first embodiment are performed at the time of the switching of the photoreceiving elements 2.

For example, the operation in the case of the readout operation is conducted as follows, First, the first MOS switches 11-1-1, 11-1-(t+1), . . . , 11-1-(t×(x−1)+1) are controlled to be in their on-states, and a readout operation is terminated. Then, every t first MOS switch 11 of the first MOS switches 11-1-2, 11-1-(t+2), . . . , 11-1-(t×(x−1)+2) is controlled to be in the turned-on state thereof by this switching control. The letter x is an integer within a range from one to k, both inclusive.

After the foresaid switching control of the photoreceiving elements 2, the start signal SP1 is input from the start signal input terminal 8 into the first sensor chip 1-1, and thereby the same readout operations as those of the previous readout operations are started again.

By repeating the switching control of the photoreceiving elements 2 and the signal readout operations t times by the selecting circuits 14, the readout operations of all of the m×n photoreceiving elements 2 are executed.

The aforesaid operation description of the present embodiment has been given to the operation in the case of the input of the start signal SP1 from the start signal input terminal 8 of the sensor chip 1-1 of the first stage as an example.

However, the present invention can also be applied to the generally frequently implemented configuration of inputting the start signal SP1 into the control circuit 5-1 and the shift register 4-1-1 through an internal logic circuit in the sensor chip 1-1.

Moreover, although the aforesaid description of the operation of the embodiment has been given to the operation of the case of inputting the start signal SP1 into the start signal input terminal 8 t times in order to conduct the readout scanning of all of the photoreceiving elements 2 as an example, the readout method of the present invention is not limited to the above one.

For example, the configuration in which, when the selecting circuit 14-1 in the sensor chip 1-1 receives a switching signal of the photoreceiving elements 2 from the switching signal input terminal 13-1, the selecting circuit 14-1 automatically generate start signals to the control circuit 5-1 and the shift register 4-1-1 may be adopted.

In the aforesaid case, single inputting of the start signal SP1 into the start signal input terminal 8 enables the readout scanning of all of the photoreceiving elements 2-1-1 to 2-*m*-*n*.

As described above, the present embodiment can shorten the time periods for selecting the photoreceiving elements 2 to t times, while the conventional configuration required t×m times because readout scanning has been repeated to all of the respective m sensor chips constituting the multi-chip type image sensor t times by the conventional configuration. Consequently, the high-speed readout of optical signal outputs can be conducted. Moreover, both of the high-speed readout and the reduction (shrink) of a chip size can be achieved.

Moreover, because the present embodiment uses the END signal of the sensor chip 1-*m* of the final stage as the timing of the switching control of the photoreceiving elements 2, the present embodiment does not need the built-in counter and the switching signal from the outside unlike the first embodiment. Consequently, the multi-chip type image sensor in more simplified configuration can be realized.

Third Embodiment

Figure 5:
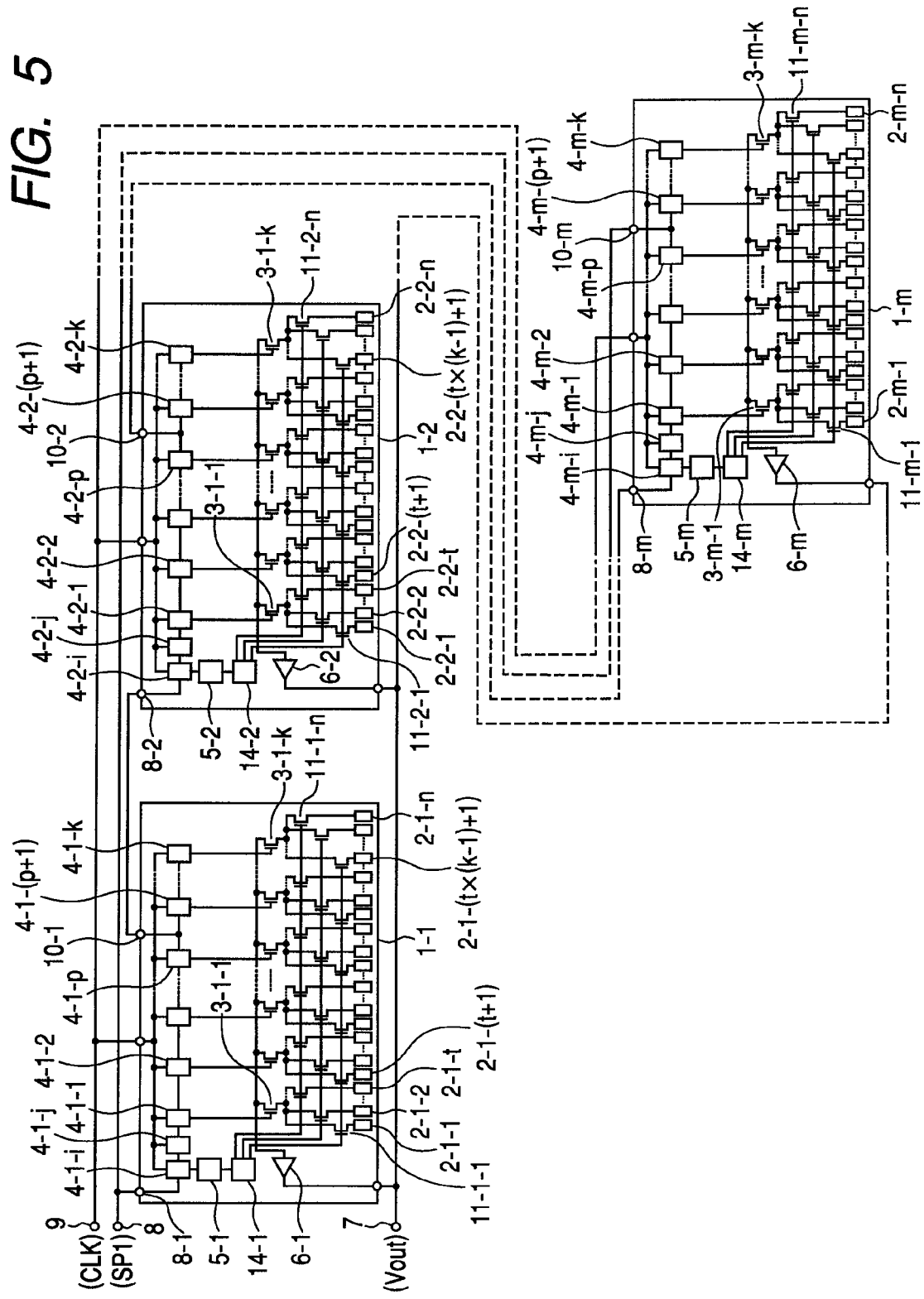
FIG. 5 is a diagram illustrating a multi-chip type image sensor including a plurality of arranged image sensor chips constituting a photoelectric conversion apparatus as a third embodiment of the present invention.

FIG. 5 illustrates the configuration of a multi-chip type image sensor including arranged image sensor chips constituting a photoelectric conversion apparatus according to a third embodiment of the present invention, and FIG. 6 is a diagram illustrating a timing chart.

The multi-chip type image sensor includes image sensor chips (hereinafter referred to as sensor chips) 1-1, 1-2, . . . , 1-*m* as illustrated in FIG. 5. In FIG. 5, the same components as those illustrated in FIG. 1 are denoted by the same reference numerals.

In the configuration of the multi-chip type image sensor of the present embodiment, the connection of the END signal from the sensor chip 1-*m* of the final stage to the start signal input terminal 8-1 of the first sensor chip 1-1 is conducted.

In the following, the operation of the multi-chip type image sensor according to the third embodiment of the present invention will be described in the order of events.

In the present embodiment, after light accumulation, the operation thereof is started by the input of the start signal SP1 from the start signal input terminal 8 into the first sensor chip 1-1 in synchronization with the clock signal CLK from the clock signal input terminal 9.

When the start signal SP1 is input, the signal readout operation of the sensor chip 1-1 is sequentially conducted similarly to the operation of the first embodiment.

When the readout operation of the sensor chip 1-1 is completed, a signal indicating the completion of the readout scanning is output from the shift register 4-1-$k$ in the sensor chip 1-1 to the selecting circuit 14-1.

The selecting circuit 14-1 switches the on-off control of the second MOS switches 11-1-1 to 11-1-$m$ in order to select k photoreceiving elements 2 to which the next time readout operations are conducted.

The same operation as that of the first embodiment is conducted for the switching of the photoreceiving elements 2.

As an example, the following operation is conducted. It is supposed that the first MOS switches 11-1-1, 11-1-(t+1), ..., 11-1-(t×(x−1)+1) are controlled to be in their on-sates and their readout operations have been completed. By switching control, every t first MOS switches 11 of the first MOS switches 11-1-2, 11-1-(t+2), ..., 11-1-(t×(x−1)+2) are controlled to be in their on-states. The letter x indicates an integer within a range from 1 to k, both inclusive.

Moreover, an END signal is output from the END signal output terminal 10-1 to the outside simultaneously with the turning-on of the MOS switch 3-1-$p$ by an output signal of the shift register 4-1-$p$ during a series of readout operations of the sensor chip 1-1.

Then, the output END signal is input to the start signal terminal 8-2 of the sensor chip 1-2 at the next stage as a start signal.

The same operation as that of the sensor chip 1-1 is sequentially conducted in the sensor chips 1 on and after the second step, the signal readout operations and the switching control of the photoreceiving elements 2 are sequentially executed to all of the sensor chips 1.

The END 10-$m$ in FIG. 6 indicates the END signal of the sensor chip 1-$m$ of the final stage.

A signal readout operation is started in the sensor chip 1-$m$ of the final stage, and the readout of the shift register at the 4-$m$-$p^{th}$ stage is conducted. At the same time, the END signal 10-$m$ is input to the start signal input terminal 8-1 of the sensor chip 1-1 as a signal for starting the second readout scanning.

When the END signal 10-$m$ is input to the start signal input terminal 8-1 of the first sensor chip 1-1, the second readout scanning is started similarly to the previous readout operation.

By repeating a series of the signal readout operation and the switching control of the photoreceiving elements 2 by the selecting circuits 14 t times, the readout operation is executed to all of the m×n photoreceiving elements 2.

However, in the present embodiment, each of the sensor chips 1-1 to 1-$m$ conducts the switching control of its own photoreceiving elements 2 immediately after the completion of readout scanning.

Consequently, it is unnecessary to arrange the time period for switching the photoreceiving elements 2 before the start of the next readout operation. Thus, it is possible to shorten the time period (one corresponding to the time period S-2 in FIG. 2) of the blank in the signal outputs Vout of the second and after readout scanning of the signal outputs Vout.

The description of the operation of the present embodiment has been given to the operation in the case of inputting the start signal SP1 from the start signal input terminal 8 of the sensor chip 1-1 of the first stage as an example.

However, the present invention can also be applied to the generally frequently implemented configuration of inputting the start signal SP1 into the control circuit 5-1 and the shift register 4-1-1 through an internal logic circuit in the sensor chip 1-1.

Moreover, although the aforesaid description has been given to the case of directly inputting the signal output from the END signal output terminal 10-$m$ of the sensor chip 1-$m$ of the final state into the start signal input terminal 8-1 of the sensor chip 1-1, the inputting method of the present invention is not limited to the above one. The configuration of arranging a switch that can switch the terminal to be connected to the start signal input terminal 8-1 of the sensor chip 1-1 between the start signal input terminal 8 of the multi-chip type image sensor and the END signal output terminal 10-$m$ of the sensor chip 1-$m$.

As described above, the present embodiment can shorten the time periods for selecting the photoreceiving elements 2 to the first one time, while the conventional configuration required t×m times because readout scanning has been repeated to all of the respective m sensor chips constituting the multi-chip type image sensor t times by the conventional configuration.

Consequently, the high-speed readout of optical signal outputs and the reduction (shrink) of a chip size can be achieved.

Moreover, because the present embodiment uses the END signal of the sensor chip 1-$m$ of the final stage as the timing of the switching control of the photoreceiving elements 2, the number of the arranged sensor chips 1 constituting the multi-chip type image sensor can be changed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-226527, filed Aug. 31, 2007, which is hereby incorporated by reference herein in its entirety.

What is claimed is:

1. A driving method of a photoelectric conversion apparatus, wherein the photoelectric conversion apparatus comprises a plurality of sensor chips each having a plurality of unit blocks, wherein each unit block comprises:
   a plurality of photoreceiving elements, a plurality of first switches each for reading a signal from a corresponding one of the photoreceiving elements, and a second switch arranged correspondingly to the plurality of first switches for reading signals from the first switches, wherein each of the plurality of first switches is connected between a corresponding one of the photoreceiving elements and the second switch;
   wherein the photoelectric conversion apparatus further comprises a common signal reading line through which signals are read out from the plurality of photoreceiving elements of the plurality of sensor chips, and
   wherein the driving method comprises:
   sequentially reading out signals from a selected one of the photoreceiving elements included in each of the plurality of unit blocks in a first sensor chip to the common signal reading line,
   thereafter sequentially reading out signals from a selected one of the photoreceiving elements included in each of the plurality of unit blocks in the second sensor chip, and
   the sequential read out of signals from the selected one of the photoreceiving elements included in each of the plurality of unit blocks in the second sensor chip starts in response to an output of a signal from one of the selected one of the photoreceiving elements included in the first sensor chip.

2. The driving method of a photoelectric conversion apparatus according to claim 1, wherein the method further comprises, after sequentially reading out of signals from the selected one of the photoreceiving elements included in each of the plurality of unit blocks in the second sensor chip, sequentially reading out signals from another selected one of the photoreceiving elements included in each of the plurality of unit blocks in the first sensor chip.

3. The driving method of a photoelectric conversion apparatus according to claim 1, wherein in each unit block, all of the plurality of first switches correspond to a common second switch.

4. A photoelectric conversion apparatus comprising a plurality of sensor chips each having a plurality of unit blocks, wherein each unit block comprises:

a plurality of photoreceiving elements, a plurality of first switches each for reading a signal from a corresponding one of the photoreceiving elements, and a second switch arranged correspondingly to the plurality of first switches for reading signals from the first switches, wherein each of the plurality of first switches is connected between a corresponding one of the photoreceiving elements and the second switch;

wherein the photoelectric conversion apparatus further comprises a common signal reading line through which signals are read out from the plurality of photoreceiving elements of the plurality of sensor chips, wherein each of the plurality of sensor chips has an input portion for inputting a signal for starting reading of signals from the photoreceiving elements, and wherein the photoelectric conversion apparatus:

sequentially reads out signals from a selected one of the photoreceiving elements included in each of the plurality of unit blocks in a first sensor chip to the common signal reading line, thereafter sequentially reads out signals from a selected one of the photoreceiving elements included in each of the plurality of unit blocks in the second sensor chip starts, and the sequential read out of signals from the selected one of the photoreceiving elements included in each of the plurality of unit blocks in the second sensor chip starts in response to an output of a signal from one of the selected one of the photoreceiving elements included in the first sensor chip.

5. The photoelectric conversion apparatus according to claim 4, wherein the plurality of sensor chips are arranged in stages, and wherein a signal outputted from a sensor chip of a second stage is inputted into the input portions of all of the sensor chips other than the sensor chip of a final stage, and the sensor chips each have a delay circuit for delaying the signal inputted into the input portion.

6. The photoelectric conversion apparatus according to claim 4, further comprising a read out circuit for driving the common signal reading line.

7. The photoelectric conversion apparatus according to claim 4, wherein the plurality of sensor chips are arranged in stages, and wherein the plurality of sensor chips are scanned in sequence, and the sensor chip of a second state is a final stage of the scanning sequence.

\* \* \* \* \*